3,037,992
PROCESS FOR PREPARING INDOLES SUBSTITUTED IN THE BENZENE RING
Jan Thesing and Gunther Mohr, Darmstadt, and Gunther Semler, Heppenheim an der Bergstrasse, Germany, assignors to Rutgerswerke-Aktiengesellschaft, Frankfurt am Main, Germany
No Drawing. Filed July 18, 1960, Ser. No. 43,278
Claims priority, application Germany Aug. 1, 1959
2 Claims. (Cl. 260—319)

This invention relates to the preparation of substitution products of indole and it has particular relation to the preparation of indoles which are substituted in the benzene ring.

It has been known that in the indole system the heterocyclic pyrrole ring is essentially more reactive to electrophilic substitutions—e.g. halogenation, nitration, sulfonation, Friedel-Crafts reaction—than the benzene ring. Therefore, in carrying out these substitutions a reaction of the substituent in the pyrrole ring can be generally observed. For this reason the preparation of indoles substituted in the benzene ring could be performed by indirect methods only.

It has been hitherto necessary either to use as starting material a phenyl hydrazone substituted in the nucleus, which was subjected to indole synthesis according to Fischer, or indole was hydrogenated to indoline, which was then subjected to the desired substitution and the substituted indoline was then dehydrogenated to the corresponding indole compound. The preparation of the substituted phenyl hydrazone as well as the procedure calling for hydrogenation and dehydrogenation, are relatively troublesome and the yields of these procedures are unsatisfactory. Moreover, said first mentioned method is not suitable for the preparation of indoles which are not substituted in the pyrrole ring. (H. R. Snyder and C. W. Smith, J. Amer. Chem. Soc. 65, 2452 (1943).)

It has now been found that reactions consisting of substitutions in the benzene ring of the indole system can be carried out if the aromatic character of the pyrrole ring in the indole molecule is temporarily canceled by the formation of an indole-2-sulfonic acid (hydrogen sulfite-compound of indole). A sulfonic acid salt of indoline reacts in the substitution reactions like an o-substituted derivative of aniline. The amino-group of the indole ring is preferably blocked according to conventional methods, for example by acylation.

According to the present invention, it is possible to substitute an indoline-2-sulfonic acid salt of the Formula I

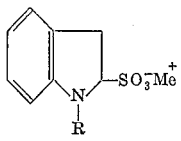

wherein R stands for H or acyl and Me is a metal ion, preferably Na or K, by halogenating and/or nitrating in the para and/or ortho-position to the amino group. Subsequently, by treatment with an alkaline agent the hydrogen sulfite and, if desired, simultaneously the protecting acyl group can be split off. In this manner, indoles substituted by Cl, Br, I and/or $NO_2$ in 5 and/or 7 position can be obtained in a simple manner. Furthermore, by treatment of a compound of the Formula I with $S_2Cl_2$ and subsequently with an alkaline agent, 5,5' di-indolyldisulfide and by reduction of the latter 5-mercapto-indol can be prepared.

Thus, the present invention relates to a process for preparing indoles substituted in the benzene ring. In this process a salt, preferably an alkali salt, of an indoline-2-sulfonic acid, which may be N-acylated, is converted into an indole derivative, in which Cl, Br, I, or $NO_2$ is substituted in 5- and/or 7-position, by subsequent or alternative treatment with a halogenating and/or nitrating agent and subsequent action of an alkaline agent. According to a modified embodiment of the invention the indoline-2-sulfonic acid, which may be acylated, is converted by treatment with $S_2Cl_2$ and subsequent treatment with an alkaline agent into 5,5'-diindolyldisulfide. If desired, the latter can be split by a conventional reducing method with hydrogenation to 5-mercapto-indole.

Nitration of a compound of the above general Formula I, can be carried out according to methods which are conventional in aromatic substitutions, e.g. by the action of a nitrating acid mixture. Thereby, first a mixture of the 5- and 7-substitution product is obtained, which can be separated e.g. by distillation with steam. Under suitable reaction conditions—e.g. extended period of treatment or increased concentration of the nitrating acid—the 5,7-di-nitro-compound can also be prepared.

By the action of acetyl nitrate on compounds of the above general Formula I, in a smooth reaction a nitro-derivative substituted exclusively in the 7-position can be obtained and the resulting product can be converted by subsequent treatment with alkali into 7-nitro-indole. This reaction can be carried out, for example in acetic anhydride as the solvent.

Furthermore, a salt of N-acyl-indoline-2-sulfonic acid, which is already halogenated or nitrated in the 5-position, can be subjected to a subsequent nitration or halogenation. In proceeding in this manner, in both cases a disubstituted indole derivative is obtained, which is differently substituted (halogenated and nitrated) in the 5- and 7-position.

The introduction of a 5-bromo substituent can be e.g. brought about by the action of elementary bromine on a compound of the above Formula I. 5-iodo-indole can be prepared by the action of iodine which can be produced e.g. from potassium iodide and iodine monochloride. Chloroindoles can be prepared by reacting a compound of the above Formula I with chlorine water, or an alkali hypochlorite, or with chlorine in glacial acetic acid. Thereby a mixture of chloro-indole derivatives substituted by chlorine in the 5- and/or 7-position are formed, which can be subsequently separated into the individual components of the mixture.

Splitting off of the acyl group protecting the amino group and of the hydrogen sulfite is preferably carried out by treatment with an alkaline agent in one reaction step. For example, concentrated potassium hydroxide or concentrated sodium hydroxide, is suitable for this reaction.

The indoles substituted in the benzene ring according to the present invention can be utilized for the preparation of further indole derivatives. For example, by the reduction of the nitro-group 5-amino indole and from the latter derivatives N-substituted in the amino-group can be prepared, according to conventional methods. From compounds which correspond to the above Formula I and are halogenated in the 5-position, 5-cyan-indole can be easily obtained.

The salts of indoline-2-sulfonic acid used as starting materials are easily obtainable. For example, the alkali salts can be obtained by reacting indole with alkali hydrogen sulfite.

The N-acyl-indoline-sulfonic acid salts are obtained from the corresponding indoline-2-sulfonic acid salts by conventional acylation methods. Examples of the latter are the conventional reactions with acetic anhydride, acetyl chloride, benzoyl chloride, p-toluene sulfonic acid chloride and with similar compounds. The N-acyl residues can be later easily removed by simple treatment with alkali according to conventional methods.

The compounds prepared according to the present invention can be used not only as starting material for further derivatives of indole but they are also important intermediate products for the preparation of pharmaceutic substances.

EXAMPLE 1

(a) *Preparation of the sodium salt of indoline-2-sulfonic acid.*—50 grams of indole are dissolved in 70 ccm. of ether and shaken with a mixture of 150 ccm. of commercial soduim hydrogen sulfite solution of 40%, 50 ccm. of water and 300 ccm. of alcohol of 96%, for 10 hours. The colorless crystals are separated by suction, washed with methanol and ether and dried.

(b) *Preparation of the sodium salt of N-acetyl-indoline-2-sulfonic acid.*—15 grams of the sodium salt of indoline-2-sulfonic acid, 15 grams of sodium hydrogen sulfite and 150 ccm. of acetic acid anhydride are subjected to fast stirring at 50° C. After about ½ hour the mixture starts to swell. After a total period of 3 hours the product is sucked off and can be used in crude condition in the subsequent reactions.

(c) *Preparation of 5-bromo-indole.*—Sodium salt of N-acetyl-indoline-2-sulfonic acid freshly prepared from 10 grams of sodium salt of indoline-2-sulfonic acid, is dissolved under cooling and stirring in 50 ccm. of water and separated from undissolved material by filtration. In the course of 1 hour 15 grams of bromine are introduced dropwise at 0°–5° C. into the solution. Subsequently, the reaction mixture is stirred at 0° C. for one hour, stirred at room temperature for a further hour, diluted with 200 ccm. of water and the clear solution is rendered alkaline at 20°–30° C. with sodium hydroxide solution of 20%. After standing over night the crystals formed are sucked off and washed with water. After recrystallization from alcohol of 30–40%, or after purification by steam distillation, colorless needles having a melting point of 90°–91° C. are obtained.

EXAMPLE 2

*Preparation of 5-iodo-indole.*—80 grams of the sodium salt of indoline-2-sulfonic acid are acetylated in the manner described in the above Example 1(b). The sodium salt of N-acetyl-indoline-2-sulfonic acid is dissolved under cooling in 300 ccm. of water and filtered. Subsequently 40 grams of potassium iodide are added and during 10 minutes 40 ccm. of iodine monochloride are dropwise added at 0°–4° C. The mixture is then stirred for one hour under cooling with ice, and then stirred for an additional hour at room temperature, 1500 ccm. of water are added, the precipitate formed is separated by filtration and the filtrate is rendered alkaline with concentrated sodium hydroxide solution at 20° C. After standing over night the precipitate formed is sucked off, washed with water and dried. Needles of a weak yellow color are obtained, which are purified by re-precipitation with water from ethanol solution and have then a melting point of 99–100° C.

EXAMPLE 3

*Preparation of 5- and 7-nitro indole.*—The sodium salt of N-acetyl-indoline-2-sulfonic acid prepared from 15 grams of the sodium salt of indoline-2-sulfonic acid in the manner described above, is disolved under good cooling and with stirring in 200 ccm. of water. To the filtered solution at 0°–5° C. a cold mixture of 50 ccm. of nitric acid of 65% with 50 ccm. of concentrated sulfuric acid are dropwise added within 30 minutes. The temperature should thereby remain below 0° C. Subsequently, the reaction mixture is stirred for one hour at 0° C. and for an additional hour at room temperature, then diluted with 150 ccm. of water and rendered alkaline with concentrated sodium hydroxide solution under cooling below 40° C. At a change point the previously light-brown solution suddenly becomes dark-brown and yellow crystals start to seperate. After standing over night the crystals are sucked off and washed with a small quantity of cold water. The precipitate consists of a mixture of 5-nitroindole with 7-nitro-indole. The still wet mixture is suspended in one liter of water and distilled with steam. The distillate thus obtained is repeatedly extracted with ether and the ether solution is evaporated after drying over sodium sulfate. The residue yields, after being subjected to chromatography in a column of aluminium oxide, by elution with a benzene-cyclohexane mixture (2:1) 7-nitroindole in the form of yellow needles having a melting point of 94°–97° C. The still hot residue of the steam distillation is sucked off. From the filtrate upon cooling the 5-nitro-indole crystallizes in almost pure form. It is separated by filtration and dried. A further amount of 5-nitro-indole can be recovered by boiling with water the residue found on the suction filter. By recrystallizing the 5-nitro-indole from benzene-cyclohexane, yellow needles having a melting point of 140°–141° C. are obtained.

As examples of the various uses of products prepared according to the present invention the following may be mentioned: 5-bromoindole can be used as an intermediate product in the preparation of harmane (see J. Am. Chem. Soc., vol. 70, page 225 (1948)); 7-nitroindole can be used for preventing the growth of a lactobacillus (see J. Organic Chemistry, vol. 22, page 84 (1957)); 5-chloroindole and 7-chloroindole can be used for biological investigations (see J. Chem. Soc. 1955, page 3501).

It will be understood from the above that this invention is not limited to the specific substances, steps, proportions and other conditions and procedures specifically described above and can be carried out with various modifications. For example, while Me stands preferably for Na or K, it may also stand for other metal ions, such as $NH_4$, Ca, or a heavy metal. These and other modifications may be made without departing from the scope of the invention as defined in the appended claims.

What is claimed is:

1. In a process for preparing chloro-, bromo-, iodo- and nitro-derivatives of indole, which contain in the benzene ring of the indole molecule a substituent selected from the group consisting of Cl, Br, I, and $-NO_2$ in a position selected from the group consisting of 5 and 7 positions (a) the step of mixing indole in solution with $MeHSO_3$ in order to form a compound of the formula

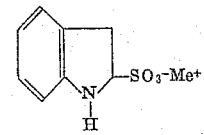

in which Me stands for a cation selected from the group consisting of Na, K, $NH_4$ and Ca; (b) mixing this compound with an N-acylating agent selected from the group consisting of acetyl- benzoyl- and p-toluene sulfonic acid radicals in order to block the amine group of the indole; (c) reacting the compound resulting in (b) with the substituent to be introduced into positions selected from the above defined group; and (d) subjecting the resulting substitution product to treatment with an alkali hydroxide in order to split off the acyl group and the hydrogen sulfite to form a product of the formula

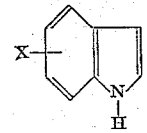

wherein X is selected from the group of substituents defined above.

2. A process as claimed in claim 1, in which Me stands for the sodium ion and the acetyl-radical is used as the N-acylating agent.

References Cited in the file of this patent

Gall et al.: J. Organic Chem., vol. 20, pages 1538–1544 (1955).

Tomino: J. Pharm. Society (Japan), vol. 77, pages 1087–1093 (1957).